Aug. 20, 1929.　　　T. CARROLL　　　1,725,253
CASH REGISTER
Filed April 30, 1921　　　5 Sheets-Sheet 1

Inventor
THOMAS CARROLL
BY *Carl Benst*
*Henry E. Stauffer*
Attorneys

Aug. 20, 1929.  T. CARROLL  1,725,253
CASH REGISTER
Filed April 30, 1921   5 Sheets-Sheet 3
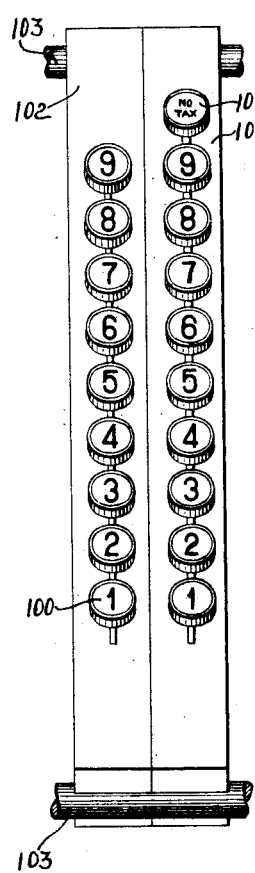
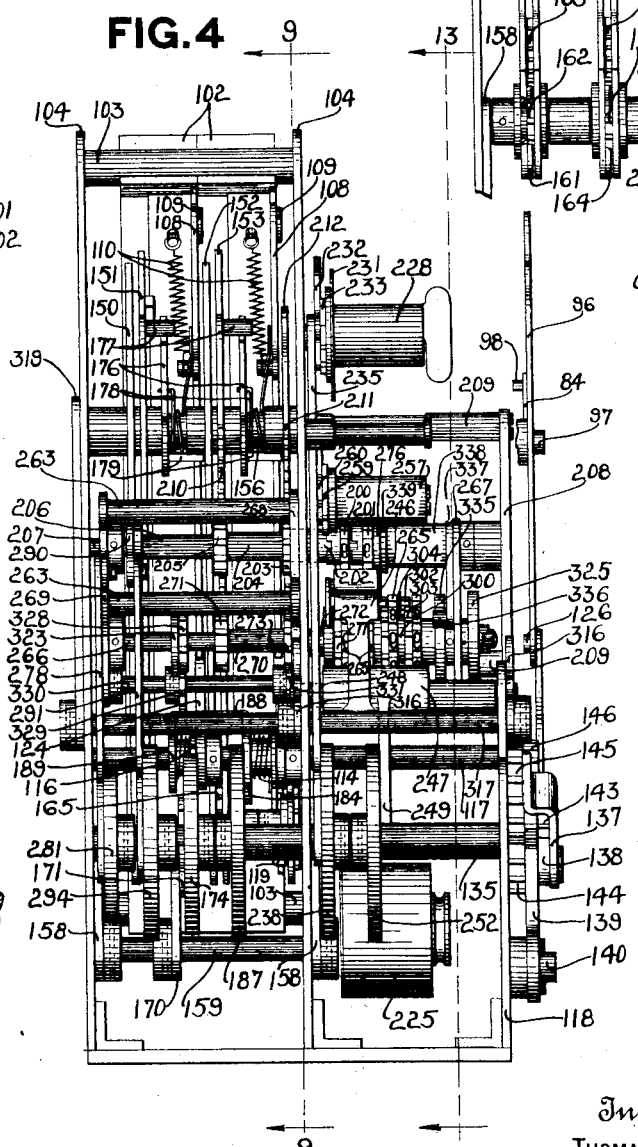
FIG. 3
FIG. 4
FIG. 5
Inventor
THOMAS CARROLL Aug. 20, 1929.  T. CARROLL  1,725,253
CASH REGISTER
Filed April 30, 1921  5 Sheets-Sheet 4
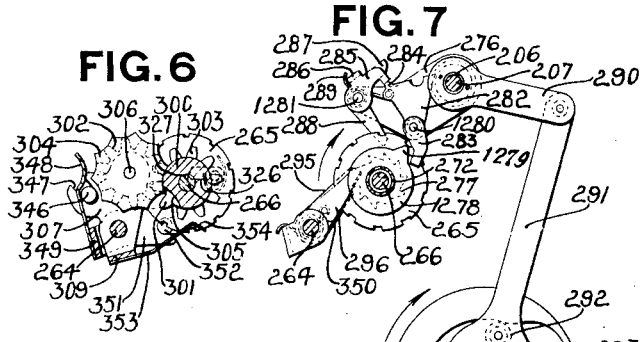
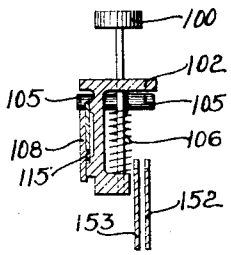
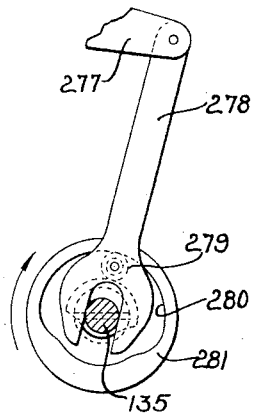
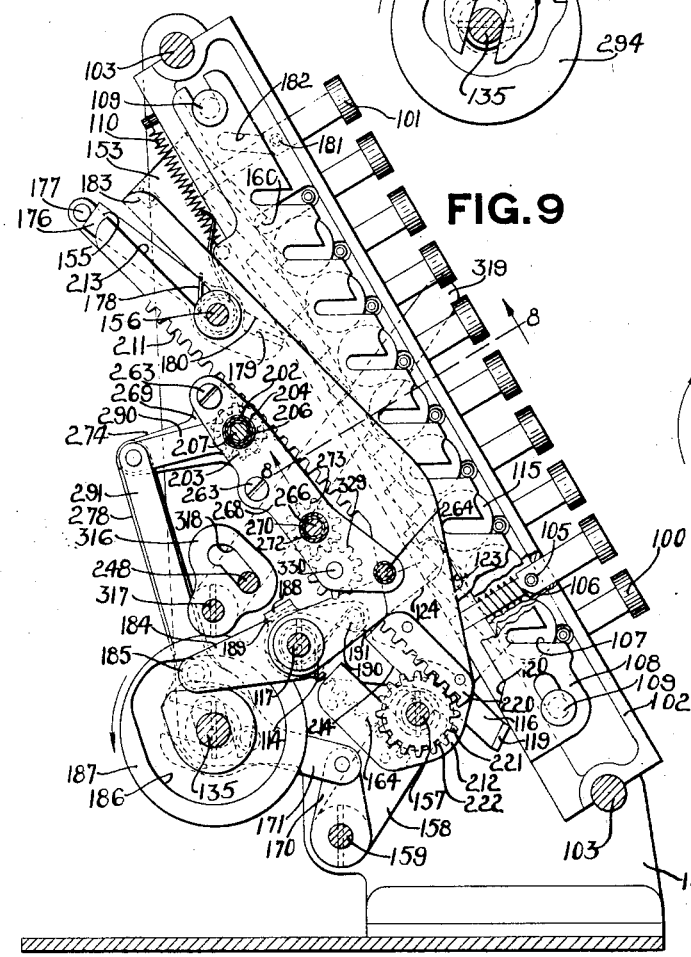
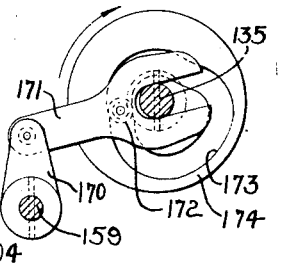
Inventor
THOMAS CARROLL Aug. 20, 1929.　　　　T. CARROLL　　　　1,725,253
CASH REGISTER
Filed April 30, 1921　　　5 Sheets-Sheet 5
FIG.12
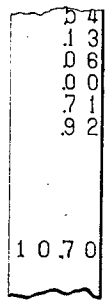
FIG.13
FIG.14
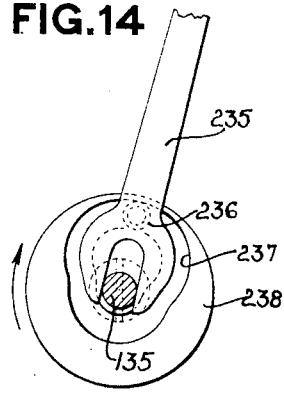
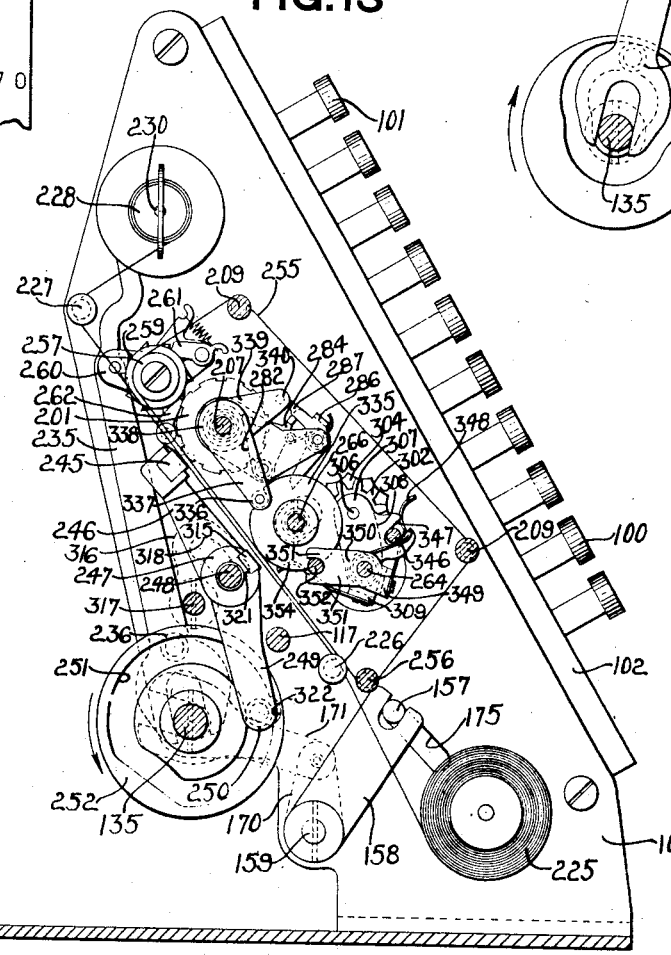
Inventor
THOMAS CARROLL
BY Pearl Beust
Henry E. Stauffer
Attorneys Patented Aug. 20, 1929.

1,725,253

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed April 30, 1921. Serial No. 465,755.

This invention relates to attachments for cash registers and the like, and is more particularly adapted to be used in connection with the type of cash registers shown and described in Letters Patent of the United States, No. 580,378, issued to Cleal and Reinhard on April 13, 1897, and the Letters Patent of the United States, No. 765,767, issued to Thomas Carroll on July 26, 1904.

In the preferred form, and as shown in the drawings, the attachment is shown in connection with a machine provided with a multiple totalizer reel, such as that shown in the above mentioned Carroll Patent, No. 765,767.

The general construction and operation of the machine with which the attachment is associated are substantially like that shown in the above mentioned patents.

The object in providing a machine of the above mentioned type with an attachment as illustrated herein is to enable a merchant selling taxable goods to keep an account of the sale of all goods upon which there is placed a Government tax, and also to keep an account of the tax collectable by the revenue department of the Government on the sale of such goods. For the accomplishment of this object the machine is so constructed that the merchant or proprietor first sets up the amount of the purchase, then depresses the tax keys to set up the amount of the tax, and then operates the machine in the usual manner, whereby the amount of the purchase is registered upon the usual totalizer and the amount of the proper tax is registered upon a special totalizer which is provided for this purpose.

Another object of this invention is to provide the machine disclosed with a mechanism whereby the merchant or proprietor is forced to operate a "Tax" or "No Tax" key before the machine can be released for operation.

With these and incidental objects in view, the invention consists in certain novel features of construction and combinations of parts, the essential elements of which are set forth in appended claims, and a preferred form or embodiment of which is hereinafter described with reference to the drawings which accompany and form part of the specification.

Of said drawings:

Fig. 3 is a plan view illustrating the tax keyboard.

Fig. 4 is a rear elevation of the tax registering attachment.

Fig. 5 is a rear elevation having parts broken away, showing the means for driving the complementary plates which control the tax totalizer and the tax printing mechanism.

Fig. 6 is a detail view illustrating the Geneva transfer mechanism for the higher order elements of the tax totalizer.

Fig. 7 is a detail view illustrating the transfer mechanism from the units to the tens totalizer elements, and shows the cam and pitman for operating the same.

Fig. 8 is a sectional view on the line 8—8 of Fig. 9, looking in the direction of the arrows.

Fig. 9 is a vertical sectional view on the line 9—9 of Fig. 4, looking in the direction of the arrows.

Fig. 10 is a detail view of the cam and pitman for rocking the totalizer frame, a portion of the frame being broken away.

Fig. 11 is a detail view of the cam and the mechanism for moving the totalizer actuators.

Fig. 12 is a fragmentary view illustrating a portion of the record strip as printed by the tax registering attachment.

Fig. 13 is a sectional view on the line 13—13 of Fig. 4, looking in the direction of the arrows.

Fig. 14 is a detail view of the cam and a portion of the pitman operated thereby for feeding the record strip and operating the ribbon feeding mechanism.

Figure 1:
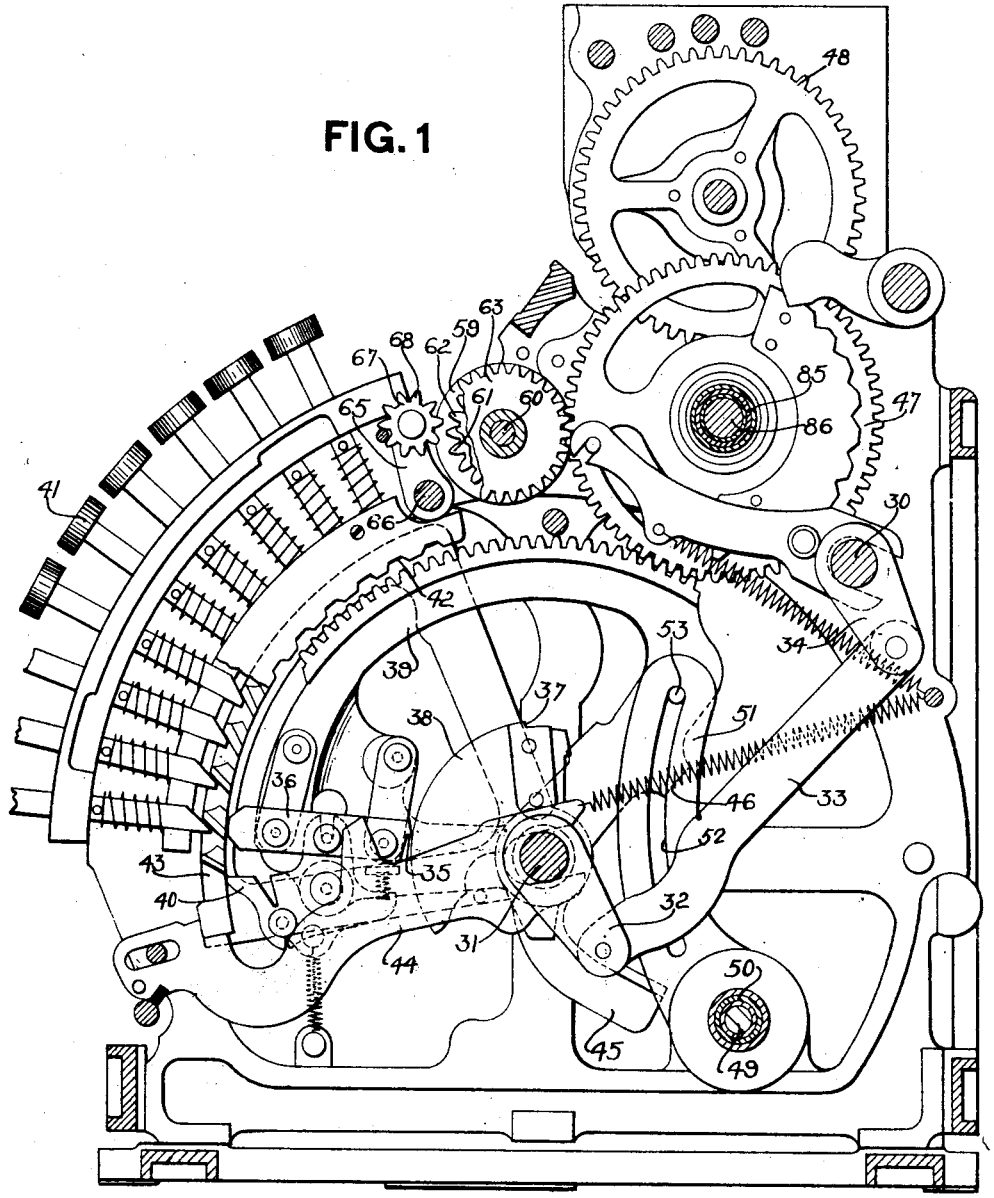
Fig. 1 is a vertical sectional view through a machine of the type illustrated in the above mentioned patents, taken alongside of one of the amount banks.

General description.

Described in general terms, the machine comprises two keyboards, one on which the regular amount of a sale is set up, and one on which the amount of tax on all taxable goods is set up. These keyboards are so arranged that a key in the tax keyboard must be operated before the machine can be released, even though the amount keys are operated, thus insuring the registration of a tax for each taxable sale.

Should the sale be non-taxable, a "No Tax" key is provided, and must be depressed before the machine can be released, thus insuring that a record is made upon the record strip to show that some article has been sold upon which there was no tax assessed.

The machine is provided with the usual multiple totalizer reel and also a main totalizer, which totalizers are operated by differential mechanism under the control of the regular amount keys.

The tax registering portion of the machine is provided with a printing mechanism for producing a detailed record which shows the amount of tax paid on each article purchased when such articles are taxable, and also prints "00" when an article has been sold, upon which there is no tax levied.

A totalizer is provided, operated by a differential mechanism under the control of the "Tax" keys, wherein is accumulated the amount of all money taken in as taxes.

This tax totalizer is provided with type so that when it is desired, the proprietor, by a manual operation which does not involve any of the previously mentioned mechanism, may print the total from said totalizer upon the record strip, after which he may rotate the totalizer to zero by the usual turn to zero key.

Operating mechanism.

The illustrative machine, to which the tax registering mechanism is attached, is, for the sake of simplicity, shown with only one amount bank and differential mechanism therefor, but as this machine is of a well known type it is to be understood that any desired number of amount banks may be used, according to the size of the business in which the register is to be used.

Running transversely through the machine is a main operating shaft 30 to which are secured the necessary cams and operating devices from which the various elements of the machine receive movement to perform their respective functions.

Any well known form of driving mechanism may be used to rotate the shaft 30. If it is desired to operate the machine by hand, the driving mechanism illustrated in the above mentioned Cleal and Reinhard patent is very well adapted for this purpose. Should it be desired to operate the machine by, for instance, an electric motor, the motor and operating mechanism illustrated and described in Letters Patent of the United States, No. 1,144,418, issued to Messrs Kettering and Chryst on June 29, 1915, is especially adapted to be used on machines of the type illustrated herein and to which the tax registering attachment is connected.

Differential mechanism.

Running transversely through the machine is a rock shaft 31 (Fig. 1) having attached thereto an arm 32 to which is connected one end of a link 33, the other end of which is fast to an arm 34 on the driving shaft 30. When the shaft 30 is rotated counter-clockwise, the arm 34 is carried with it, whereby, through the link 33 and arm 32, the shaft 31 is rocked over an arc of about 90°, first counter-clockwise and then clockwise back to normal position. During the counter-clockwise movement of the shaft 31, a shoulder 35 on a plunger 36 is engaged by a shoulder 37 on an actuator 38 fast on the rock shaft 31 and through the connection so formed, the adding rack or segment 39 is rotated clockwise during the clockwise oscillation of the actuator 38 until a trip 40 pivotally mounted on the adding rack, and having a pin and slot connection with the plunger 36, strikes the end of a depressed key 41 and causes the shoulder 35 on the plunger 36 to be disengaged from the shoulder 37 on the actuator 38, thereby disabling the connection between the segment 39 and the actuator 38. The keys 41 are held in depressed position by the usual detent 43 and a retaining bar 44. As the plunger 36 is disengaged from the actuator 38 it is projected into one of the notches 42 corresponding to the depressed key so as to hold the segment 39 in its differentially adjusted position according to the value of the depressed key.

Also fast on the shaft 31 is a restoring arm 45 which cooperates with a surface 46 on each of the segments 39 to return all segments to their normal positions during the counter-clockwise movement of the shaft 31.

The segment 39 is at all times in mesh with an intermediate gear 47 and the differential adjustment of the segment 39 is transmitted through the gear 47 and a pinion (not shown) to an indicator gear 48. Indicators above mentioned are fully illustrated and described in the above mentioned Cleal and Reinhard patent, and for a detailed description of the same reference may be had to this patent.

Regular amount printer.

Extending across the machine is a shaft 49 (Fig. 1) and a series of nested sleeves 50, concentric with and supported by said shaft. Attached to the shaft and to each of the sleeves is an arm 51 having a curved slot 52 receiving a pin 53 carried by the segment 39. Through this connection the differential movement of the segment 39 is transmitted to the shaft 49 and the sleeves 50. Through this shaft and the sleeves, the amount recorded by the keys 41 is transferred to a printing mechanism which may be of the type illustrated and described in the above mentioned Carroll Patent No. 765,767, but as the printing mechanism forms no part of the present invention none has been shown herein.

Main totalizer.

This totalizer is adapted to accumulate therein the amounts of all purchases outside of the tax. A totalizer of this type is fully illustrated and described in the above mentioned Cleal and Reinhard patent, and therefore but a brief description thereof will be given herein, as reference may be had to this patent for a more detailed description. This totalizer comprises totalizer wheels 59 (Fig. 1), mounted upon a transverse shaft 60. Secured to the totalizer wheel 59 is a pinion 61. In axial alinement with the pinion 61 is another pinion 62 secured to the side of a gear 63 that meshes with the intermediate gear 47. An arm 65, secured to a shaft 66, is provided adjacent each totalizer element. Each arm 65 carries a stud 67 on which is mounted a broad pinion 68 of sufficient width to simultaneously mesh with the pinion 61 secured to the totalizer wheel 59 and the pinion 62 fast to the gear 63.

From the above description it can be seen that the differential movement of the segment 39 is transmitted through the gear 47 to the gear 63 and the pinion 62 and through the broad pinion 68 to the pinion 61 and the totalizer wheel 59.

Suitable means are provided for rocking the arms 65 to engage and disengage the pinion 68 relatively to the pair of pinions 61, 62, upon the return movement of the segment 39, the amount which has been put upon the totalizer 59 will not be taken therefrom. This mechanism is old and well known in the art and is illustrated in the above mentioned Cleal and Reinhard patent, and no description of it is necessary herein.

Multiple totalizer reel.

As before stated, the tax registering attachment is shown associated with a machine of the type illustrated in the Carroll Patent, No. 765,767, and also in the Letters Patent of the United States, No. 703,639, issued to Thomas Carroll on July 1, 1902. Both of these patents show and describe the multiple totalizer reel and the mechanism for operating the same. Therefore, but a brief description thereof will be given herein, it being sufficient to state that this mechanism consists of a reel 75 (Fig. 2) mounted on a stud 76 carried by a reciprocable frame 77 operated substantially like the frame shown in the last mentioned Carroll patents. The reel 75 carries a plurality of totalizers 78 and is rotated on the stud 76 by means of the usual pinch lever 79 which operates like the pinch lever illustrated and described in the above mentioned Kettering and Chryst Patent, No. 1,144,418. The function of the pinch lever 79 is, as above stated, to rotate the reel 75 to move one of the totalizers 78 to the proper position, whereby, when the frame 77 is reciprocated, said totalizer is moved into engagement with its actuating mechanism. This actuating mechanism is operated through the gears 47 (Fig. 1), tubes 85 and shaft 86, but as this mechanism is fully shown and described in the above mentioned Carroll patents and as it is not a part of the present invention, it will not be described further herein. Another function of the pinch lever 79 is, as described in the above mentioned Kettering and Chryst patent, to partially release the mechanism which rotates the main operating shaft 30. This mechanism is fully illustrated and described in the above mentioned Kettering and Chryst patent. When the pinch lever 79 is operated, a latch releasing shaft 87, corresponding to shaft 72 of Carroll Patent 703,639 above mentioned, is caused to rock slightly counter-clockwise (Fig. 2), but as shown in this figure, further movement is prevented until after one of the "Tax" keys has been depressed. The device operated by the "Tax" keys for displacing the obstruction to the rotation of the shaft 87, so that the shaft may be rocked, will now be described.

The "Tax" keys and the mechanism for rocking this device will be later described in connection with the tax registering mechanism itself. Secured to the shaft 87 is an arm 88 normally slightly spaced (not shown) from a flattened arresting stud 89 carried by an arm 90 fast on a shaft 91 journaled in the arms 92. The arresting stud 89 normally lies in the path of the arm 88 on the release shaft 87 to prevent effective operation of the shaft. The arresting stud is controlled by the keys used in setting up the amount of tax, and by the "No Tax" key as follows. Secured to the shaft 91 is an arm 93 carrying a stud 94 which projects into a slot 95 in the upper end of a lever 96 mounted on a stud 97 carried by one of the frames of the machine. The lever 96 is held in normal position by a spring 84 having one end against a stud 98 on the lever 96 and the other end against a stud 99 on the machine frame.

By means to be hereinafter described and under the control of the "Tax" keys, the lever 96 is rocked first counter-clockwise (Fig. 2) against the tension of the spring 84. This movement of said lever, through the slot 95 and stud 94, rocks the arm 93, the shaft 91 and the arm 90 in a clockwise direction to swing the arresting stud 89 out of the path of the arm 88. After this displacement of the stud 89 relatively to the arm 88, the pinch lever 79 may, if not already operated be operated to partially release the shaft 87. After the operation of the pinch lever, one of a series of keys commonly known in the art as "clerks' initial keys", may be operated to fully release the shaft 87, whereby through the mechanism shown in the above mentioned Kettering and Chryst Patent, No. 1,144,418, the shaft 87 is caused to rock its full counter-clockwise movement, to release the motor clutch and enable the motor to rotate the shaft 30 counter-clockwise, (Fig. 1) or clockwise, as viewed in Fig. 2.

Tax registering attachment.

*Keyboard mechanism.*—The keyboard for the tax registering attachment comprises two series or rows of keys 100 (Figs. 2, 3, 9 and 13), one series for the units and the other series for the tens. There is also provided in the units bank a "No Tax" key 101. The keys are slidably mounted in key frames 102 carried by rods 103 mounted between the parallel side frames 104 (Fig. 4). Secured to and projecting through each of the keys 100 is a stud 105. (Figs. 8 and 9.) The keys 100 and 101 are held in their normal positions by means of compression springs 106. One end of each of the studs 105 cooperates with its respective inclined slot 107 formed in a detent bar 108 (Figs. 4, 8 and 9), slidably mounted on studs 109 carried by the frame 102. The detent 108 is held in the normal position by a spring 110 stretched between a pin carried by the frame 102 and a pin carried by said detent.

Means is provided for preventing a depression of more than one key in a series at one time. This means comprises a series of disks 115 (Figs. 8 and 9) mounted in a longitudinally extending groove formed in the frame 102. These disks are adjacent the detent bar 108, and are so arranged that when one of the keys is depressed, its stud 105 will enter between two adjacent disks 115, and crowd all of the disks on opposite sides of the stud together, thereby preventing any of the other studs 105 from being moved therebetween. Depression of any of the keys 100 through the camming action of its stud 105 on the lower wall of its inclined slot 107, moves the detent 108 downward (Fig. 9).

The means for releasably retaining the detent 108 in its shifted position, and thereby retaining the keys 100 in depressed position comprises an arm 116 loose on a shaft 117 extending between the frames 104 and a frame 118 parallel to the frames 104. The arm 116 is provided with a lateral lip 119 held in engagement with the rear edge of the detent 108 by a torsion spring 114. The detent bar 108 has a shoulder 120 so that, as it reaches its lowest position, the arm 116 is rocked counter-clockwise (Fig. 9) by the spring 114, whereby the lip 119 contacts the shoulder 120 and retains the detent in its downward position.

Each of the detents 108 is provided with a recess 123 into which projects the end of an arm 124 fast on the shaft 117 (Figs. 4 and 9). Also fast to the shaft 117 is an arm 125 (Figs. 2 and 4) carrying a stud 126 which projects into a slot 127 in the lower end of the previously described lever 96.

From this description it will be clear that the depression of any of the keys 100, through the downward movement of the detent 108, rocks the arm 124 clockwise, whereby the shaft 117 and the arm 125 are rocked clockwise. The clockwise movement of the arm 125 through the stud 126 and slot 127 rocks the lever 96 counter-clockwise (Fig. 2), as previously described, in order to release the pin 89 from the arm 88, so that the pinch lever 79 and the clerks' initial keys may be operated to release the machine for operation.

Near the end of the operation of the machine, the arm 116 is rocked clockwise to normal position by means to be hereinafter described, whereby its lip 119 releases the shoulder 120 in the detent bar 108, thereby allowing the spring 110 to restore the detent bar to its normal position, thus releasing the depressed keys. The recess 123 in the detent 108 is of sufficient length to allow the detent to return to its normal position without interfering with the arm 124. The arm 124 is restored to its normal position near the end of the rotation of the shaft 30 (Fig. 2) when the shaft 87 is rocked counter-clockwise, as is fully illustrated and described in the above mentioned Kettering and Chryst patent. This is accomplished by the torsion spring 84 which also rocks the lever 96 clockwise to normal position, whereby the arm 125 and shaft 117 are rocked counter-clockwise, thus rocking the arms 124 clockwise to normal position.

*Operating mechanism for the tax registering mechanism.*—The tax registering mechanism is provided with a cam shaft 135 (Figs. 2, 4, 9 and 13) which is given one complete revolution in a counter-clockwise direction (Figs. 2, 9 and 13) at each operation of the machine. The means for rotating the shaft includes a disk 136 (Fig. 2) secured to the main operating shaft 30. Pivoted to the disk 136 is the upper end of a link 137 the lower end of which is pivoted to an arcuate plate 138 secured to a rocking segment 139 mounted on the stud 140 carried by the frame 118. The arcuate plate 138 is provided with teeth 141 and the segment 139 is provided with teeth 142. The teeth 141 on the arcuate plate 138 cooperate with a mutilated pinion 143 secured to the side of a gear 144 fast on the shaft 135. The gear 144 meshes with a gear 145 secured to the side of a mutilated pinion 146 which cooperates with the teeth 142 on the segment 139.

Rotation of the shaft 30, through the link 137, rocks the segment 139 and its arcuate plate 138, first clockwise from, and then counter-clockwise to, normal position. During the clockwise movement, the teeth 141 on the plate 138 engage the mutilated pinion 143 and rotate said pinion and the gear 144 counter-clockwise, whereby the gear 145 and the mutilated pinion 146 are rotated clockwise. This positions the mutilated pinion 146 so that when the segment 139 and plate 138 are rocked counter-clockwise, the teeth 142 on the segment 139 engage the mutilated pinion 146 and rotate the pinion still farther in clockwise direction, whereby clockwise rotation of the gear 145 is continued, thus rotating the gear 144, and consequently the cam shaft 135, still farther counter-clockwise until it completes one rotation. This mechanism is fully illustrated and described in the Letters Patent of the United States, No. 1,265,301, issued to Thomas Carroll on May 7, 1918. Therefore, it is thought that the brief description above, is all that is necessary, as, for a more detailed description and illustration, the above mentioned patent may be referred to.

*Differential actuators.*—The means for setting up the printing mechanism, to be later described, and also for accumulating amounts in the "Tax Totalizer", to be hereinafter described, and under control of the keys 100, includes a pair of plates 150 and 151 (Figs. 4 and 5) for controlling the units tax totalizer element, and a pair of plates 152 and 153 (Figs. 4, 5 and 9) for controlling the tens element of the tax totalizer. These plates are provided with a slot 155 which embraces a rod 156 carried by the frames 104. The plates are supported at their lower ends on a shaft 157 supported by parallel arms 158 (Figs. 2, 4, 9 and 13) fast on a shaft 159 journaled in the frames 104. The plates 150 and 151 are provided on their forward edges with shoulders 160 (Fig. 9) adapted to cooperate with the studs 105 in the tax keys 100, but the shoulders 160 on one of each pair of plates occupy positions complementary to the shoulders on the remaining member of the pair of plates. The pairs of plates 152 and 153 are provided with shoulders exactly like the shoulders 160 on the plates 150 and 151. These shoulders are so arranged that, as the plates are being drawn downward, by means to be hereinafter described, when one of the shoulders 160 on one of a pair of plates contacts the stud 105 of the depressed key and is arrested thereby, the other member of the pair of plates continues to move until its shoulder 160, which cooperates with that particular key, engages the same stud 105. These plates are known in the art as "complementary plates". If the "2" key 100 is depressed, one member of the pair of plates moves two spaces and the other plate moves seven spaces, or vice versa, the combined movement of the two plates always being equal to nine spaces.

The plate 150 has secured to the side thereof near its lower end, a rack 161 (Fig. 5) meshing with a pinion 162 fast on the shaft 157. The pinion 162 meshes with a rack 163 fast on the plate 151. The plate 152, which cooperates with the tens bank, carries a rack 164 (Fig. 9) meshing with a pinion 165 loose on the shaft 157. The pinion 165 meshes with a rack 166 secured to the plate 153.

By means to be later described, the shaft 157 and the pinions thereon are moved toward the right and downward (Fig. 9), thereby moving the two pairs of plates 150, 151 and 152, 153 downward until their shoulders 160 engage the stud 105 on the depressed key 100. When one of the plates engages the stud on the key, it arrests its respective rack; thereby allowing the pinion 162 or 165, whichever the case may be, to roll over said rack and thus move the other rack and its respective plate until it is stopped by the same stud which stopped the first-named rack. As before stated, this movement is called a "complementary movement" and is fully illustrated and described in Letters Patent of the United States, No. 1,202,800, issued to Thomas Carroll on Oct. 31, 1916, and for a more detailed description of this movement reference may be had to this patent.

The means for moving the shaft 157 to cause the plates 150, 151 and 152, 153 to be moved differentially under the control of the tax keys 100 comprises the parallel arms 158 fast on the shaft 159, and an arm 170 (Figs. 4, 9, 11 and 13) also fast on the shaft 159. Pivoted to the arm 170 is a pitman 171, the forward end of which is bifurcated to embrace the shaft 135. The pitman 171 carries an anti-friction roller 172 which projects into a cam race 173 in the side of a disk 174 fast on the shaft 135. The configuration of the cam race 173 is such that at the proper time, the arms 170 and 158 are rocked first clockwise (Fig. 9) and then counter-clockwise to normal position. The shaft 157 being carried by the arms 158 is moved downward and toward the right (Fig. 9) by the clockwise movement of the arms 158, as just described, and is returned to normal position by the counter-clockwise movement of the said arms to their normal positions. As the shaft 157 projects through one of the frames 104, said frame is provided with a slot 175 (Fig. 13) to permit lateral swinging of the shaft 157.

The plates 151 and 153 are locked in their normal positions by their respective levers 176, (Figs. 4 and 9), the upper ends of which are held in engagement with studs 177 on the plates 151 and 153 by torsion springs 178. The lower ends of the levers 176 are provided with laterally turned lips 179 extending far enough to the right (Fig. 4) to come into the path of movement of the rear edge of each of the detents 108. The downward movement of the detent 108 causes a projection 180 thereon (Fig. 9) to contact the laterally extending lip 179 of the lever 176, and rock said lever clockwise, thereby displacing its upper end from in front of the stud 177 to allow the corresponding pair of plates to be moved differentially under the control of the tax key which has been depressed in that particular bank.

When the detent bar 108 is returned to its normal position, it releases its pressure against the lip 179 on the lever 176, and allows the spring 178 to hold the side edge of the lever against the stud 177 until the plate 151 or 153, whichever the case may be, is returned to its normal position, whereupon spring 178 snaps the lever 176 underneath the stud 177.

The plates 150 and 152 are not locked in the normal position, because said plates must move nine steps when the "No Tax" key 101 is depressed, due to the fact that the shaft 157 is moved a definite distance for each operation of the machine, regardless of whether a tax is registered or not. However, these plates 150 and 152 do not have any control over the printer or the totalizer when they are operated alone.

As before stated, before the detent bar 108 can be returned to its normal position by the spring 110, the arms 116 must be rocked clockwise to normal position. The means for rocking these arms 116 comprises a restoring lever 184 (Figs. 4 and 9) loose on the shaft 117. The rear end of the restoring lever 184 carries an anti-friction roller 185 projecting in a cam race 186 in the side of a disk 187 fast on the cam shaft 135. The lever 184 forms one arm of a bail, comprising in addition an arm 189 (Fig. 4) loose on the shaft 117 connected with lever 184 by a yoke 188. The arm 189 and the forward end of the lever 184 each carry a pin 190, each of said pins cooperating with a projection 191 on the respective arms 116. The shape of the cam race 186 is such that the lever 184 and the arm 189 are rocked first clockwise and then counter-clockwise to normal position. As before stated, when the detent bar 108 is moved downward, the arms 116 are rocked counter-clockwise under the influence of the springs 114, so that their lips 119 lie in contact with the shoulders 120 of the detents 108. This movement of the arms 116 rocks the projections 191 thereof against the pins 190. Hence it can be seen that the clockwise movement of the lever 184 and arm 189 causes the pins 190 to rock the arms 116 clockwise back to normal position, thereby allowing the springs 110 to move the detents 108 upward to their normal positions, thus interposing the unreduced rear edges of the detent bars 108 in the paths of the offset lips 119 on the arms 116 to hold the arms in their home positions. The restoring lever 184 and the arm 189 are then rocked counter-clockwise to their normal positions thus leaving a clearance between the pins 190 and the projections 191 on the arms 116, so that on depression of any of the tax keys for a subsequent operation of the machine, there is room for the springs 114 to rock the arms 116 to hold the detents in their moved positions.

As stated before in the early part of this specification, it is necessary to press either a "Tax" key 100 or a "No Tax" key 101 before the machine can be released for operation. This "No Tax" key 101 is shown in Fig. 9 and is provided with a pin 181 which cooperates with an inclined slot 182 formed in the detent bar 108 associated with the units bank of tax keys. Depression of the "No Tax" key 101, through the pin 181 and slot 182, moves the detent bar 108 downward the same extent as when any of the tax keys 100 are depressed, and rocks the arm 124 the same distance, thereby causing it to rock the shaft 117, and consequently the arm 125, whereby the lever 96 is rocked counter-clockwise (Fig. 2) to rock the arms 93 and 90 and displace the stud 89 from the path of the arm 88 on the release shaft 87, so that said shaft may be rocked counter-clockwise to release the machine as previously stated.

Also, as previously described, the downward movement of the detent bar 108 rocks the lever 176 (Fig. 9) clockwise and releases the pair of complementary differential plates 150, 151, or 152, 153 associated with that detent. However, when the "No Tax" key 101 is depressed, its end enters the path of a block 183 (Fig. 9) secured to the differential plate 153, thus preventing the plate from being moved downward upon movement of the shaft 157.

*Detail printing mechanism.*—As previously stated, the tax registering attachment is adapted to print a detail record strip, such as that illustrated in Fig. 12. The mechanism for accomplishing this comprises two type wheels 200 and 201 (Fig. 4). The type wheel 200 is connected by a sleeve 202 to a gear 203 (Fig. 4). The type wheel 201 is connected by a sleeve 204 to a gear 205. The sleeve 204 is loose on a sleeve 206, the purpose of which will be hereinafter described, the sleeve 204 being rotatable about a shaft 207 mounted in the left hand frame 104 (Fig. 4) and a plate 208 (Figs. 2 and 4) secured to and spaced apart from the right hand frame 104, by studs 209. The pinion 205 meshes with teeth 210 (Figs. 4 and 5) on the rear edge of the previously described differential plate 153 associated with the tens bank of keys 100. The gear 203 meshes with teeth 211 (Figs. 4, 5 and 9) on the rear edge of an auxiliary plate 212 having a slot 213 to receive the rod 156 and a slot 214 to receive a rotatable collar 215 on the shaft 157. The auxiliary plate 212 is similar to the previously described differential plates 151 and 153, except that it has no shoulders 160. However, this plate 212 is moved by the differential plate 151 under the control of the units bank of keys. This plate 212 has on the side thereof, a rack 220 (Figs. 5 and 9) meshing with a gear 221 integral with the rotatable collar 215. Also integral with the collar 215 is a disk 222 provided with a hub secured to the shaft 157. It will be remembered that the gear 162, which meshes with the racks 161 and 163 on the pair of complementary differential plates 150 and 151, is also secured to the shaft 157. Therefore, the movement of this gear by the differential plates 150 and 151 under the control of the tax keys 100 in the units bank, is transmitted through the shaft 157, the gear 221, and the rack 220 to the auxiliary plate 212 and from there to the units type wheel 200. The gear 205 (Fig. 4) transmits the movement of the differential plate 153 associated with the tens bank of tax keys 100 to the tens type wheel 201, by means of the sleeve 204.

From this it can be seen, that upon depression of the keys 100 in either the units or tens bank, the amount commensurate with the value of the key depressed is set up on the type wheels 200 and 201.

The reason for the auxiliary plate 212 to control the units type wheel will be hereinafter set forth in connection with the tax totalizer resetting mechanism.

The detail strip upon which the tax type wheels 200 and 201 are caused to make an impression, is fed from a supply roll 225 (Figs. 2, 4 and 13) up, and in front of a stud 226, thence beneath the type wheels, then over another stud 227, and finally the strip is wound on a receiving roll 228. The supply roll 225 turns on a stud 229 carried by one of the frames 104. The receiving roll is loose on a stud 230 carried by the same frame 104. Secured to the side of the receiving roll 228 is a disk 231 (Fig. 4) having fast to the side thereof a ratchet 233. A lever 232 freely mounted on the stud 230 carries a spring-pressed pawl 234 engaging the ratchet 233. The other end of the lever 232 has pivoted thereto the upper end of a pitman 235, (Figs. 2, 4 and 14) the lower end of which is bifurcated to straddle the cam shaft 135. The pitman 235 carries an antifriction roller 236 which projects within a cam race 237 in the side of a disk 238 fast on the shaft 135. The configuration of the cam race 237 is such that, at the proper time, the pitman 235 is moved first downward and then up to its normal position. The downward movement of the pitman rocks the lever 232 counter-clockwise, (Fig. 2) whereby the pawl 234 is caused to advance the ratchet 233 one tooth space to wind the paper upon the receiving roll 228. A spring-pressed retaining pawl 239 (Fig. 2) engages the underside of the ratchet 233 and prevents any retrograde movement of said ratchet when the lever 232 is rocked clockwise as the pitman 235 is being moved upward to its normal position.

The means for taking an impression from the type wheels 200 and 201 comprises a resilient platen 245 (Fig. 13) mounted in an arm 246 integral with a casting 247 loose upon a shaft 248. Also integral with the casting 247 is an arm 249 carrying an anti-friction roller 250 which projects within a cam race 251 in the side of a disk 252 fast on the cam shaft 135.

The cam race 251 is so shaped that, at the proper time, it rocks the arm 249 and arm 246 first clockwise and then counter-clockwise to normal position. The clockwise movement causes the platen 245 to be pressed against the type wheels 200 and 201, thereby taking an impression from the type upon the detail strip, such as is illustrated in Fig. 12.

The means for inking the type comprises an endless ribbon 255 carried by the studs 209, a stud 256 and a ribbon feed roller 257 (Fig. 2) mounted on a stud 258 carried by the right hand frame 104. Secured to the side of the feed roller 257 is a ratchet 259. A lever 260 pivotally mounted on the stud 258 carries a spring-pressed pawl 261 which cooperates with the ratchet 259. One end of the lever 260 is also pivotally mounted on the previously described pitman 235, so that as said pitman is moved downward, the lever 260 is rocked counter-clockwise, whereby the pawl 261 advances the ratchet 259 and the feed roller 257, so as to advance the ribbon 255 step by step to prevent the type from striking the same place for two successive printing operations. In order to prevent retrograde movement of the ratchet 259 when the lever 260 is rocked clockwise as the pitman 235 is moved upward to its normal position, a spring-pressed retaining pawl 262 cooperates with the ratchet 259.

Figure 2:
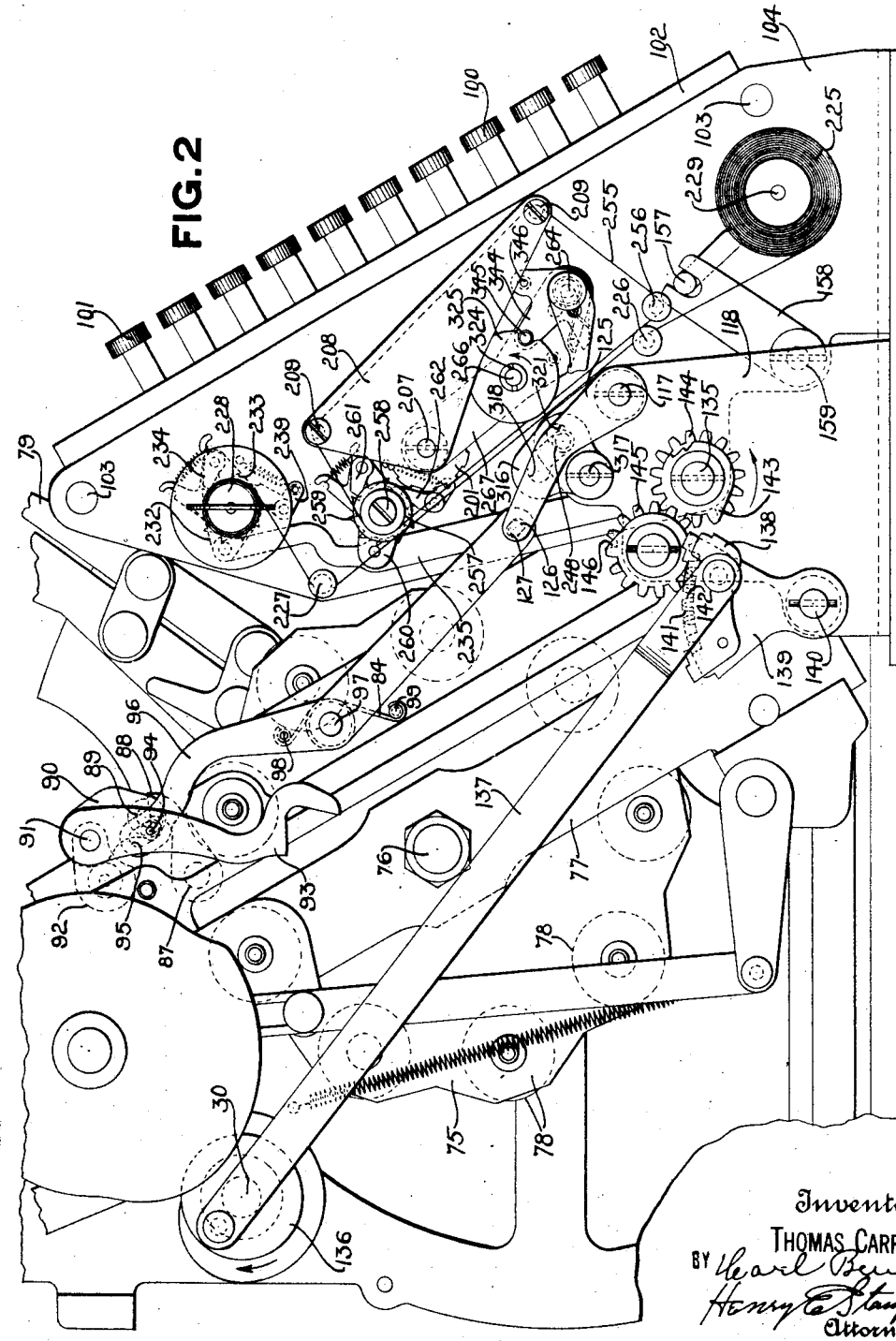
Fig. 2 is a left hand elevation of a machine such as illustrated in the above mentioned Carroll Patent No. 765,767, and illustrates a side elevation of the tax registering attachment and its control over the releasing mechanism of the machine.

*Tax totalizer.*—The previously mentioned tax totalizer comprises four totalizer wheels 265 (Fig. 4) mounted in a rockable frame consisting of three side plates 267, 268 and 269 (Figs. 2, 4 and 9). The side plates 268 and 269 are tied together by two rods 263, and the side plates 267 and 268 are tied together by a rod 264. The totalizer wheels 265 for the hundreds and thousands digits are mounted loose on a shaft 266 mounted in the frame plates 267 and 269. The totalizer wheel 265 for the tens is also mounted loose on the shaft 266, but has secured thereto a sleeve 270 to the other end of which is secured a gear 271, which is adapted to mesh with the teeth 210 on the differential plate 153. The units tax wheel 265 is mounted loose on the sleeve 270, but has secured thereto a sleeve 272 to the other end of which is fastened a gear 273 adapted to mesh with the teeth 211 on the auxiliary differential plate 212 which is driven, as previously described, by the complementary differential plates 150 and 151.

The totalizer frame plate 269 has a rearwardly extending arm 274 (Figs. 9 and 10) to which is pivoted the upper end of a pitman 278, the lower end of which is bifurcated to embrace the cam shaft 135. The pitman 278 carries an antifriction roller 279 which projects into a cam race 280 formed in the side of disk 281 fast on the cam shaft 135. The frame plate 269 is fast on the shaft 207; the plate 267 is also fast on the shaft 207, the frame plate 268 being intermediate the two is loose upon the sleeve 202 encircling the shaft 207.

From the above description it can be seen, that upon rotation of the disk 281, the pitman 278 is moved first downward and then back to normal position. The downward movement of said pitman rocks the frame plate 269, the shaft 207 and the frame plate 267, with the shaft 207 as the pivot point, first counter-clockwise and then clockwise to normal position. The counter-clockwise movement takes place after the differential plates 153 and 212 have been differentially positioned under the control of the tax keys 100. This counter-clockwise movement of said frame plates engages the pinions 271 and 273 of the respective totalizer wheels with the teeth 210 and 211, respectively of the tens differential plate 153 and the units auxiliary differential plate 212, so that as the plates 153 and 212 are returned to their normal positions, as previously described, the amount as set up by the depressed keys, is accumulated upon the units and tens totalizer elements 265. After the differential plates have reached their normal position the frame plates 267 and 269 are rocked clockwise (Fig. 9) to their normal positions by the upward movement of the pitman 278 to its normal position.

*Transfer mechanism.*—The mechanism for transferring from the units to the tens totalizer wheels 265 is shown in Fig. 7. Secured to the side of the units wheel 265 and the tens wheel 265 respectively, is a ratchet 277. Secured to the ratchet 277 associated with the units wheel is a disk 1278 provided with a tripping projection 1279. Secured to the right hand end of the previously mentioned sleeve 206 (Fig. 4) is an arm 276 carrying two studs 1280 and 1281. Pivoted on the stud 1280 is a rocking arm 282 connected by a hub to a trip tooth 283 rigid therewith. The arm 282 has a projection 284 normally in contact with the free end of a spring-pressed pawl 285 loose on the stud 1281. Connected with the pawl 285 by means of a yoke 286 is an arm 287 having integral therewith a carrying pawl 288 adapted to cooperate with the ratchet 277 associated with the tens totalizer wheel 265. A spring 289 holds the rocking arm 282 against a hub on the shaft 207, and also holds the pawl 285 in contact with the projection 284. Secured to the left hand end of the sleeve 206 on shaft 207 is an arm 290, to which is pivoted the upper end of a pitman 291, the lower end of which is bifurcated to embrace the cam shaft 135. The pitman 291 carries an anti-friction roller 292 projecting into a cam race 293 in the side of a disk 294 fast on the cam shaft 135.

The tripping projection 1279 on the disk 1278 is so arranged that as the units wheel 265 passes from "9" to "0", said projection 1279 wipes past the tripping tooth 283 rigid with the rocking arm 282 and rocks said tripping tooth and consequently the arm 282, counter-clockwise, thereby rocking the projection 284 from underneath the pawl 285. This permits the pawl 285, the arm 287 and the carrying pawl 288 to rock clockwise under the influence of the spring 289, thereby positioning the carrying pawl 288 in cooperative relation with the ratchet 277 associated with the tens wheel 265. When the elements are in the tripped position, as just described, and the pitman 291 is moved upwardly by the cam race 293, the arm 290, the sleeve 206 and the arm 276 are rocked counter-clockwise to force the carrying pawl 288 against the ratchet 277 and advance said ratchet and the tens totalizer wheel 265, one step. The arm 276 and the arm 290 are then rocked clockwise to normal position by the downward movement of the pitman 291.

To prevent retrograde movement of the tens totalizer wheel 265 and its associated ratchet 277 during the time the transfer elements are restored to their normal position, a spring-pressed retaining pawl 295 mounted on the rod 264 engages the ratchet 277. Cooperating with the ratchet 277 associated with the units totalizer wheel 265 is another spring-pressed pawl 296, identically the same as the pawl 295 which cooperates with the ratchet associated with the tens totalizer wheel. This pawl 296 prevents retrograde movement of the units wheel 265 and also holds said wheel in alignment.

The transfer mechanism for transferring from the tens to the hundreds and from the hundreds to the thousands is shown in Fig. 6, and is of the well known Geneva movement type of transfer. It comprises a disk 300 secured to the side of the tens wheel 265. This disk 300 has a single gear tooth 301 which cooperates with a pinion 302 meshing with a pinion 303 secured to the hundreds wheel 265. The pinion 302 is loose on a rod 306 (Figs. 6 and 13) carried by arms 307 and 308 connected by a yoke 309. These arms are loose on the rod 264. Fast to the side of the pinion 302 is a disk 304, the periphery of which has a succession of arcuate concavities formed therein on radii corresponding to the periphery of the disk 300. The disk 300 is also provided with a cut-away portion 305 which is for the clearance of the teeth formed at the junctures of adjacent concavities.

The tooth 301 on the disk 300 is so positioned that, as the tens wheel 265 passes from "9" to "0," it engages the pinion 302 and rotates said pinion one tooth. This pinion 302 rotates the pinion 303 secured to the hundreds wheel 265 one tooth. There being ten teeth in each of the pinions 302 and 303, it is equivalent to advancing the hundreds wheel 265 one step.

The transfer from the hundreds to the thousands wheel is exactly the same as from the tens wheel to the hundreds wheel, therefore it will not be described.

*Total Printing.*—As previously stated, the tax totalizer is adapted to print the total of the accumulated tax upon the detail strip. For the accomplishment of this object, each of the totalizer wheels 265 is provided on its periphery with a series of type ranging from "0" to "9." Cooperating with these accumulating wheels is a resilient platen 315 (Fig. 13) carried by the previously described printer frame 247.

As previously stated, this printer frame is rotatably mounted on the shaft 248. The shaft 248 is pivotally mounted in slots 318 formed in a pair of arms 316 (Figs. 2, 4, 9 and 13) fast on a shaft 317 mounted in and extending between the outside frame 104 and the frame 118. Also secured to the shaft 317 is a manually operable lever 319. In order to print the total from the totalizer wheels 265, the lever 319 is moved clockwise (Fig. 9) by the operator, whereby, through the cam slots 318, the shaft 248 is shifted forwardly a distance sufficient to cause the platen 315 to contact the type on the periphery of the accumulating total wheels 265 and cause an impression to be made therefrom upon the detail strip. The operator then moves the lever 319 counter-clockwise to normal position.

To allow for this just described movement of the shaft 248, the frame 118 (Fig. 2) and the middle frame 104 (Fig. 13) are each provided with a slot 321. The cam race 251 is also provided with a clearance cut 322 for the roller 250 when the total lever 319 is moved to take an impression from the totalizer wheels 265.

*Turn to zero mechanism.*—After printing a total from the totalizer wheels 265 they may be reset to zero. The means for accomplishing this comprises a disk 325 (Figs. 2 and 4) fast on the shaft 266. The disk is provided with a hub having a mortise 324 adapted to be engaged by the usual turn to zero key. The tens, hundreds and thousands wheels 265 each carry the usual turn to zero pawl 326 (Fig. 6) adapted to be engaged by a notch 327 in the shaft 266, so that as said shaft is rotated clockwise (Figs. 2 and 6) by the turn to zero key said notch picks up the pawls 326 during rotation of the shaft 266 and rotates the tens, hundreds and thousands wheels 265 to zero position. The means for turning the units wheel 265 to zero is different, because the wheel, as previously described, is mounted to rotate on the tube 270. Therefore, a pawl 326, if in this wheel, could not reach the shaft. For this reason, the shaft 266 is provided with a disk 323 (Fig. 4) carrying a pawl identical with the pawl 326 (Fig. 6) adapted to be engaged by another notch, like the notch 327, which is provided in the shaft 266 underneath the disk 323. When the shaft is turned to zero, it rotates this disk 323 to zero position. Secured to the side of the disk 323 is a pinion 328 meshing with a pinion 329 (Figs. 4 and 9) fast on a shaft 330 carried by the totalizer frame plates 268 and 269. Also secured to the shaft 330 is pinion 331 meshing with the pinion 273 which, it will be remembered, drives the units wheel 265 by means of the sleeve 272. Through the pinion 329, the shaft 330 and the pinion 331, the movement of the disk 323 to zero position is transmitted to the units wheel 265, thus resetting said wheel to zero position simultaneously with the resetting of the tens, hundreds and thousands wheels 265.

During the resetting of the totalizer wheels to zero, it is necessary to render the transfer mechanism from the units to the tens wheel ineffective, and also to render the regular Geneva transfer mechanism ineffective. This is accomplished in the following manner. Secured to the shaft 266 is another disk 335 (Figs. 4 and 13) having a notch in its periphery in which normally rests a pin 336 carried by an arm 337 secured to a hub 338 loose on the shaft 207. Secured to the other end of the hub 338 is an arm 339 carrying a pin 340 adapted to cooperate with the previously described transfer arm 287. From this it can be seen that, upon counter-clockwise rotation of the shaft 266 and disk 335 by the turn to zero key, the pin 336 is cammed out of the notch in the disk 335, and caused to ride upon the true periphery of the disk 335. This causes the arms 337 and 339 to be rocked clockwise (Fig. 13), whereby the pin 340 is positioned in front of the transfer arm 287, so that, should the transfer trip pawl 283 be tripped, the arm 287 and the pawl 288 are not allowed to rock. Therefore, as soon as the trip cam 1279, (Fig. 7) passes the trip pawl 283, said pawl is rocked back to its normal position by the spring 289, whereby the projection 284 will again lie beneath the pawl 285, which is the normal position for said parts.

The means for rendering the Geneva transfer mechanism ineffective comprises a bell crank 344, (Fig. 2) which carries a pin 345 normally resting within a notch in the periphery of the resetting disk 325. The bell crank 344 also carries another pin 346 which projects into a slot 347 (Fig. 6) in the arm 307 of the supporting frame for the Geneva movement. The counter-clockwise rotation of the disk 325 (Fig. 2) by the turn to zero key, causes the pin 345 to ride upon the true periphery of said disk 325, thereby rocking the arm 344 clockwise, which through the pin 346, rocks the arm 307 and the arm 308 clockwise (as viewed in Fig. 13) and counter-clockwise (as viewed in Fig. 6), thus rocking the pinions 302 out of mesh with the pinions 303 on the totalizer wheels 265.

To prevent the Geneva transfer mechanism from getting out of alignment when it is rocked out of engagement with the pinions 303, a wide spring 348 is provided, the ends of which are shaped so as to fit the concavities on the Geneva disks 304. This spring is carried on a yoke 349 which connects arms 350 (Fig. 13) and 351 (Figs. 6 and 13) loose on the shaft 264. These arms are held against movement by a slotted arm 351 which embraces a pin 352 carried by totalizer frame plate 267.

The totalizer wheels 265 are resiliently held in alignment by a spring 353 (Fig. 6) carried by the yoke 309 which connects arms 350 and 351. This spring is split so that its ends 354 can go between the wheels 265 and be rocked into engagement with the pinions 303 during the movement of the two arms 307 and 308 when they are rocked to disengage the Geneva transfer mechanism from the totalizer wheels.

As the disks 325 and 335 assume their normal positions, or in other words, after the totalizer wheels 265 have reached their zero positions, the pins 345 and 336 engage the notches in their respective disks.

Operation.

A brief description of the general operation of the machine will now be given.

Let it be assumed that a customer comes into a store and purchases an article for, say 90¢, and that said article is subject to the usual 10% war tax. The operator first depresses the "9" tax key 100 in the units bank. Depression of the "9" key moves its respective detent 108 downward (Fig. 9), removes the lever 176 from the path of the pin 177 in the plate 153, and rocks the arm 124 clockwise. The detent is retained in moved position by the latching arm 116 associated therewith. The rocking of the arm 124 clockwise, rocks the shaft 117 clockwise (Fig. 2) and through the arm 125, rocks the lever 96 counter-clockwise, whereby the arms 93 and 90 are rocked clockwise to displace the pin 89 from above the arm 88 on the release shaft 87.

The amount keys 41 next are depressed to set up the regular amount of the article, which in this case is 90¢.

After this, the operator pinches the pinch lever 79 and rotates the reel 75 to position the desired totalizer 78 for operation. After this, the final release key, which, as previously described, may be either a clerk's initial key or a motor key, is operated. Operation of this key causes the shaft 87 to be rocked counter-clockwise (Fig. 2) to release the motor clutch (provided the machine is operated by a motor, and if operated by hand, it releases the usual locking member from the gear so that the handle may be operated), so that one counter-clockwise rotation is given to the main operating shaft 30 (Fig. 1). Operation of this shaft rocks the shaft 31 first counter-clockwise and then clockwise to normal position, whereupon the segment 39, through the latch mechanism 36, is rotated until said latch is disconnected from the actuator 38 by its engagement with the end of the depressed amount key 41. Through the gears 47, 63, 62, 68 and 61, the amount is accumulated upon the main totalizer wheel 59. The amount is also set up on the usual indicators through the indicator gears 48.

Rotation of the shaft 30, through the link 137 (Fig. 2), segment 139 and toothed plate 138, causes the shaft 135 to receive one counter-clockwise revolution. This, through the pitman 171, arm 170 and arms 158 (Figs. 4, 9 and 11) moves the shaft 157 downward, thus causing the differential plates 150 and 151 to be set differentially under the control of the depressed key 100. This movement, through the auxiliary differential plate 212 and teeth 211 thereon, is set up on the tax type wheel 200. After the amount has been set up on this type wheel, the platen 245 (Fig. 13) is moved into engagement with the type wheel to take an impression therefrom upon the detail strip, such as is illustrated in Fig. 12. After this plate has been moved differentially, the tax totalizer frame is rocked, whereby the tax totalizer is engaged with the actuating mechanism, and the tax amount set up under the control of the tax key 100, is accumulated upon the totalizer wheels 265. This accumulation takes place during the time that the actuating differential plates are being restored to their normal positions, as has already been described in detail. After the amount has been accumulated upon the tax totalizer, the frame is rocked to its normal position.

After the totalizer has been thrown out of engagement with the actuating means, the detail paper is advanced to space the printing thereon ready for a subsequent operation of the machine. Near the end of the operation of the machine, the latching arm 116 is rocked clockwise, (Fig. 9) and releases the key detent 108, whereupon its spring 110 restores it to normal position, thus releasing the tax key 100, and at the same time, allowing the stop lever 176 to be rocked into engagement with the stud 177, thereby locking the actuating differential plates in their normal positions. After the detent bar 108 has been restored to its normal position, and the actuating differential members locked, the arm 88 (Fig. 2) is rocked clockwise, thus releasing the stud 89 and allowing the spring 84 to rock the lever 96 clockwise whereby the arms 90 and 93 are rocked counter-clockwise to their normal positions to move the stud 89 above the arm 88. Movement of the lever 96 to normal position rocks the arms 125 and the arms 124 to their normal positions ready for a subsequent operation of the machine.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of item printing elements, total printing elements, an impression hammer provided with an operating arm and a platen-carrying arm, a platen on said platen-carrying arm for cooperating with said item printing elements, a floating pivot for said hammer, a platen on said hammer for cooperating with said total printing elements, means cooperating with said operating arm during an operation of the machine for taking an impression from said item printing elements, said means having a recess to permit an additional movement of said operating arm when desired, means cooperating with said pivot for taking an impression from said total printing elements, and a lever for operating said last mentioned means.

2. In a machine of the class described, the combination of two sets of printing elements, an impression hammer provided with an operating arm and a platen-carrying arm, a platen on said platen-carrying arm for cooperating with one of said sets of printing elements, a floating pivot for said hammer, a platen on said hammer for cooperating with the other of said sets of printing elements, means cooperating with said operating arm during an operation of the machine for taking an impression from said first set of printing elements, said means being constructed to permit of an additional movement of said operating arm when printing from the second set of printing elements, means cooperating with said pivot for taking an impression from said second set of printing elements, and means for operating said last mentioned means.

3. In a machine of the class described, the combination of two sets of printing elements, a pivoted impression hammer, two platens mounted on the same side of said hammer, a floating pivot for said hammer, means for rocking said hammer about its pivot to take an impression from one set of printing elements, said means being constructed to permit of a separate movement of said floating pivot, and means for moving said pivot to take an impression from the other set of printing elements.

4. In a machine of the class described, the combination with a plurality of sets of adjustable type carrying elements, of an impression hammer common to said sets of type carrying elements and lying in proximity thereto, said hammer comprising a single pivoted arm, separate platens immovably mounted in spaced relation on the single arm in correspondence with the respective sets of type carrying elements, and a plurality of separate means to actuate the single arm to render either platen effective and the other ineffective.

In testimony whereof I affix my signature.

THOMAS CARROLL.

CERTIFICATE OF CORRECTION.

Patent No. 1,725,253. Granted August 20, 1929, to

THOMAS CARROLL.

It is hereby certified that error appears in the printed specification of the above numbered patent requiring correction as follows: Page 1, line 40, after the word "machine" insert the word "herein"; page 2, line 71, for the word "fast" read "pivoted", and in the same line after the numeral "34" insert the word "fast"; page 3, line 35, after the numeral "62" insert the words "so that"; and that the said Letters Patent should be read with these corrections therein that the same may conform to the record of the case in the Patent Office.

Signed and sealed this 15th day of October, A. D. 1929.

(Seal)

M. J. Moore,
Acting Commissioner of Patents.